(12) United States Patent
Jung et al.

(10) Patent No.: US 10,425,519 B2
(45) Date of Patent: Sep. 24, 2019

(54) MULTI-PURPOSE DEVICE INCLUDING MOBILE TERMINAL AND SENSING DEVICE USING RADIO-WAVE BASED SENSOR MODULE

(71) Applicant: Samsung Electronics Co., Ltd., Suwon-si (KR)

(72) Inventors: Jae-Young Jung, Suwon-si (KR); Minchul Seo, Suwon-si (KR); Dong Seok Cho, Seoul (KR); Jonghee Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/944,476

(22) Filed: Nov. 18, 2015

(65) Prior Publication Data

US 2016/0234369 A1    Aug. 11, 2016

(30) Foreign Application Priority Data

Feb. 6, 2015   (KR) .................. 10-2015-0018582

(51) Int. Cl.
*H04B 1/38* (2015.01)
*H04M 1/725* (2006.01)
*H04B 1/3888* (2015.01)
*H04L 29/08* (2006.01)

(52) U.S. Cl.
CPC ...... *H04M 1/72527* (2013.01); *H04B 1/3888* (2013.01); *H04L 67/12* (2013.01); *H04M 2250/12* (2013.01)

(58) Field of Classification Search
CPC .......... H04M 1/72527; H04M 2250/12; H04B 1/3888; H04L 67/12
See application file for complete search history.

(56) References Cited

U.S. PATENT DOCUMENTS

| | | | |
|---|---|---|---|
| 8,275,413 B1 * | 9/2012 | Fraden | H04M 1/72522 455/344 |
| 8,368,583 B1 | 2/2013 | Piesinger | |
| 8,417,296 B2 * | 4/2013 | Caballero | H04B 1/3838 455/566 |
| 9,502,750 B2 * | 11/2016 | Yarga | H01Q 1/243 |
| 2007/0193438 A1 * | 8/2007 | Asukai | G06F 16/40 84/612 |
| 2008/0211708 A1 * | 9/2008 | Haberland | G01S 7/4004 342/27 |
| 2009/0258669 A1 * | 10/2009 | Nie | H04B 1/71637 455/552.1 |
| 2010/0222687 A1 * | 9/2010 | Thijs | A61B 5/02438 600/508 |
| 2011/0286632 A1 * | 11/2011 | Tuxen | A63B 24/0021 382/103 |

(Continued)

FOREIGN PATENT DOCUMENTS

KR      10-1173477 B1     8/2012
KR   10-2014-0091342 A    7/2014

*Primary Examiner* — Edward F Urban
*Assistant Examiner* — Max Mathew
(74) *Attorney, Agent, or Firm* — NSIP Law

(57) ABSTRACT

A sensing device includes a radio-wave based sensor module, and a control processor configured to transmit data sensed by the radio-wave based sensor module to a mobile terminal. A holder is configured to hold the mobile terminal and to comprise the radio-wave based sensor module.

17 Claims, 21 Drawing Sheets

(56) References Cited

U.S. PATENT DOCUMENTS

| | | | | |
|---|---|---|---|---|
| 2012/0003933 A1* | 1/2012 | Baker | .................... | H04W 76/38 |
| | | | | 455/41.2 |
| 2012/0029345 A1* | 2/2012 | Mahfouz | ................ | G16H 50/50 |
| | | | | 600/427 |
| 2012/0144076 A1* | 6/2012 | Yang | ..................... | G06F 3/0346 |
| | | | | 710/63 |
| 2012/0296567 A1* | 11/2012 | Breed | .................... | G01C 21/26 |
| | | | | 701/468 |
| 2013/0259016 A1* | 10/2013 | Xhafa | .................. | H04W 84/18 |
| | | | | 370/338 |
| 2014/0355588 A1* | 12/2014 | Cho | ..................... | H04L 12/2816 |
| | | | | 370/338 |
| 2015/0078130 A1* | 3/2015 | Urban | ..................... | G01S 15/87 |
| | | | | 367/93 |
| 2016/0191619 A1* | 6/2016 | Wang | .................. | H04L 67/1095 |
| | | | | 709/204 |
| 2016/0245276 A1* | 8/2016 | Robison | ................ | E21B 43/127 |
| 2016/0292461 A1* | 10/2016 | Yan | ..................... | G06F 21/6218 |
| 2016/0374608 A1* | 12/2016 | Dugan | ................ | A61B 5/6831 |
| | | | | 600/301 |
| 2017/0189752 A1* | 7/2017 | Mohrman | ............... | G01C 21/16 |
| 2018/0354506 A1* | 12/2018 | Minemura | ................ | B60T 7/12 |

\* cited by examiner

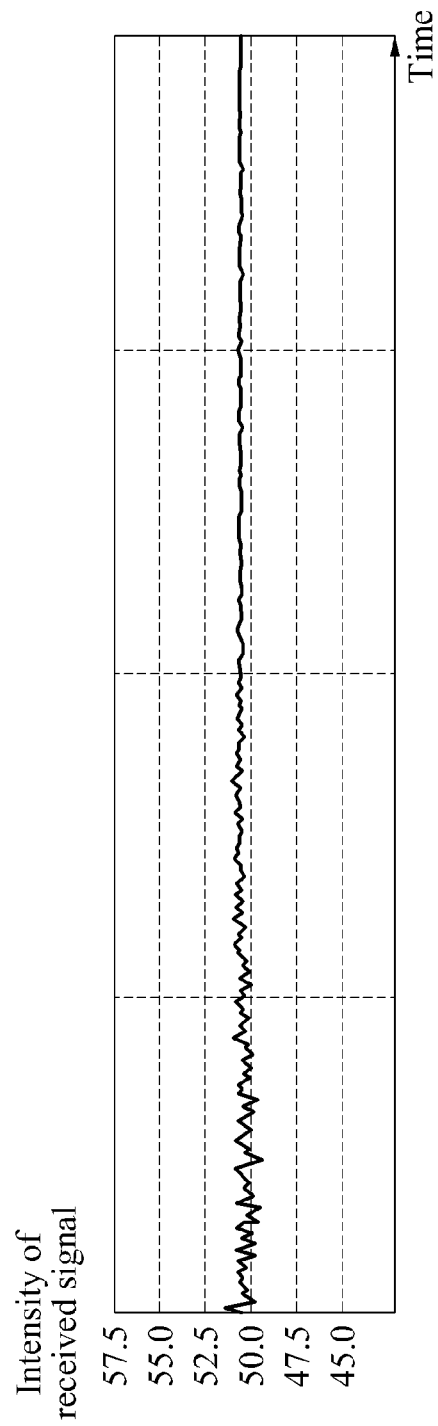

700

MULTI-PURPOSE DEVICE INCLUDING MOBILE TERMINAL AND SENSING DEVICE USING RADIO-WAVE BASED SENSOR MODULE

CROSS-REFERENCE TO RELATED APPLICATION(S)

This application claims the benefit under 35 USC 119(a) of Korean Patent Application No. 10-2015-0018582, filed on Feb. 6, 2015, in the Korean Intellectual Property Office, the entire disclosure of which is incorporated herein by reference for all purposes.

BACKGROUND

1. Field

The following description relates to a multi-purpose device including a mobile terminal and a sensing device using a radio-wave based sensor module.

2. Description of Related Art

In a case of using an image sensor, an infrared sensor, or an ultrasonic sensor, a disturbance, such as external illumination may affect sensing performance of the sensor. In particular, the sensing performance of the ultrasonic sensor may be influenced by a foreign material on a surface thereof, and the material may interrupt remote sensing of bio-information of a human. A radar sensor, in turn, which uses a radio wave, may not be influenced by a same disturbance as the ultrasonic sensor. Instead, as the radar sensor forms a wide beam of a single channel and various obstacles and people are present in a beam area, the radar beam may have difficulties in identifying a predetermined obstacle and a predetermined user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a sensing device, including a radio-wave based sensor module; and a control processor configured to transmit data sensed by the radio-wave based sensor module to a mobile terminal.

The sensing device may also include a holder configured to hold the mobile terminal and to include the radio-wave based sensor module.

The holder may be configured to hold the mobile terminal with a display of the mobile terminal facing a user.

The sensing device may also include a driver configured to drive a motor, wherein the control processor may be configured to receive a control signal from the mobile terminal to drive the motor, and control the driver based on the control signal.

The sensing device may include a mover including a wheel or propeller configured to be operated by the driver, wherein the control processor may be configured to receive a control signal from the mobile terminal to drive the motor and to operate the mover.

The control processor may be configured to transmit, to the mobile terminal, identification information to identify a target to be connected to the sensing device.

The radio-wave based sensor module may sense a position and a motion of the target, or a position and a distance from the target.

A sensing signal sent by or transmitted from the radio-wave based sensor module may be an impulse signal that is generated using a delay characteristic of a digital logic gate, and includes a frequency spectrum in which energy is distributed in a wide frequency band.

The radio-wave based sensor module may detect a distance between the radio-wave based sensor module and an obstacle based on a time difference between a transmission of a sensing signal and a reception of a reflected signal from the obstacle.

Based on a reduction in an amount of energy of a reflected signal with respect to a proceeding distance between the radio-wave based sensor module and an obstacle, the radio-wave based sensor module may calculate the distance between the radio-wave based sensor module and the obstacle as corresponding to the detected amount of energy.

In accordance with an embodiment, there is provided a mobile terminal, including an attachment configured to be attached to a sensing device and including a radio-wave based sensor module; a communicator configured to receive sensed data from the sensing device; and a processor configured to process the sensed data.

The processor may be configured to process the sensed data to estimate at least one of bio-information of a user, position information of the user, and position information of an obstacle.

The processor may be configured to generate a control signal to drive a motor controlling a driver included in the sensing device in response to the estimated position information of the user indicating a movement of the user.

The mobile terminal may also include a display configured to display the estimated at least one information.

The processor may be configured to generate emergency medical information based on the bio-information, and the communicator may be configured to transmit the emergency medical information to a medical institution server.

The communicator may be configured to receive, from the sensing device, identification information to identify a target connected to the sensing device, and the processor may be configured to process the sensed data based on the identification information.

The identification information may include a characteristic code identifying the target to be connected to the sensing device and a control code to control the target.

In accordance with an embodiment, there is provided a mobile terminal, including a target system; a communicator configured to receive sensed data from a sensing device, the sensing device including a radio-wave based sensor module; and a controller configured to estimate at least one of a gesture and a motion of a user based on the sensed data, and control the target system based on at least one of the gesture and the motion.

The controller is configured to control the target system by verifying, based on the sensed data, whether the gesture or the motion of the user is moving away from or close to the sensing device or whether the gesture or the motion of the user moves laterally with respect to the sensing device.

The target system may include an audio system including a speaker.

The controller may be configured to control the audio system to play or pause music by verifying, based on the sensed data, whether the gesture or the motion of the user is moving away from or close to the sensing device.

The controller may be configured to control a volume of the speaker by verifying, based on the sensed data, whether the gesture or the motion of the user is moving away from or close to the sensing device.

The controller may be configured to control at least one of playing music on the audio system, stopping or pausing playback of music, controlling a volume of the speaker, playing back a previous or subsequent song, and playing a melody based on at least one of the gesture and the motion of the user.

The communicator may be configured to receive, from the sensing device, identification information to be used to identify the sensing device, and the controller may be configured to process the sensed data based on the identification information.

Other features and aspects will be apparent from the following detailed description, the drawings, and the claims.

BRIEF DESCRIPTION OF THE DRAWINGS

FIGS. 5A and 5B are graphs illustrating examples of signals received after a sensing radio wave is sent by a radio-wave based sensor module, in accordance with an embodiment.

Figure 1A:
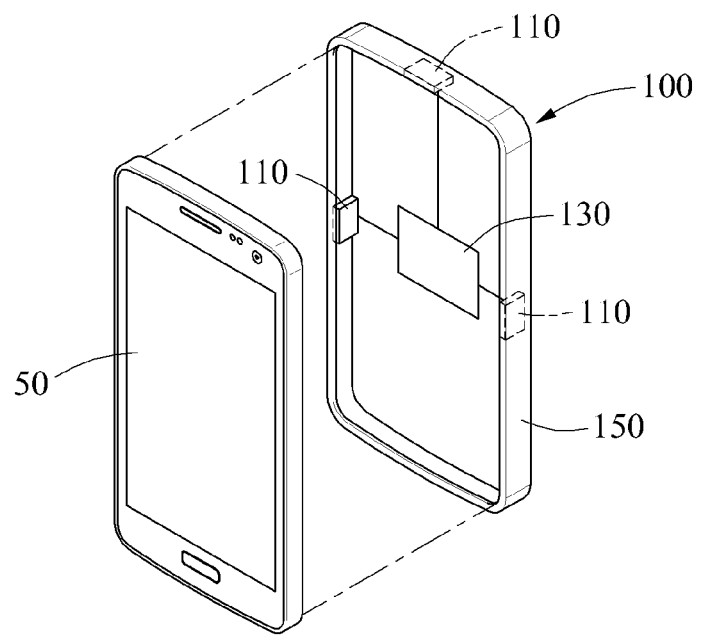
FIGS. 1A and 1B are diagrams illustrating examples of a sensing device, in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

It will be understood that when an element or layer is referred to as being "on", "attached to", or "connected to" another element or layer, it can be directly on or connected to the other element or layer or through intervening elements or layers may be present. In contrast, when an element is referred to as being "directly on", "directly attached to", or "directly connected to" another element or layer, there are no intervening elements or layers present. Like reference numerals refer to like elements throughout. As used herein, the term "and/or" includes any and all combinations of one or more of the associated listed items.

Figure 1B:
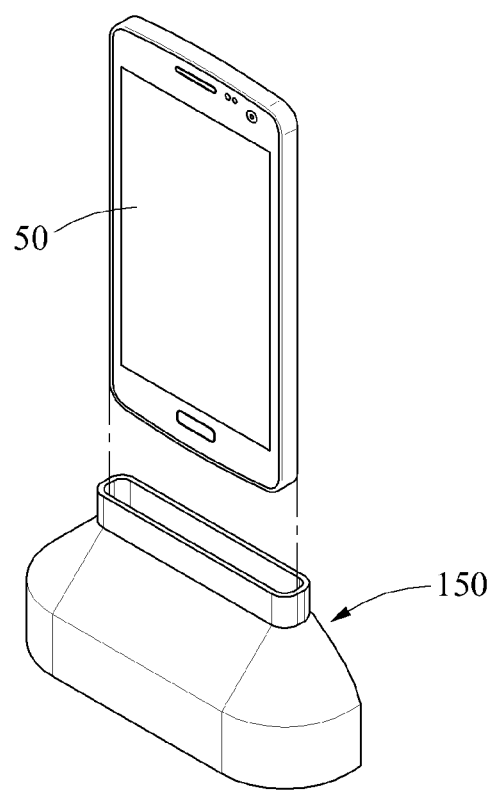

FIGS. 1A and 1B are diagrams illustrating examples of a sensing device, in accordance with an embodiment.

Referring to FIG. 1A, a sensing device 100 includes at least one radio-wave based sensor module 110, a control processor 130, and a holder 150.

The radio-wave based sensor module 110 senses data related to a target within a sensing range using a radio wave. When a user is within the sensing range, the radio-wave based sensor module 110 senses a signal indicative of a breath, a heartbeat, and/or a motion of the user. When a puppy or an obstacle is within the sensing range, the radio-wave based sensor module 110 senses a position and a motion of the puppy, or a position of the obstacle and a distance from the obstacle.

For example, the radio-wave based sensor module 110 is an ultra wideband (UWB) radar module that sends an impulse radio wave. The radio-wave based sensor module 110 employs the UWB radar module. However, examples are not limited thereto. The radio-wave based sensor module 110 employs a radar module using a typical radio wave or other radio-wave based sensor modules. The sensing device 100 includes a single radio-wave based sensor module 110 or a plurality of radio-wave based sensor modules 110.

The control processor 130 transmits the data sensed by the radio-wave based sensor module 110 to a mobile terminal 50. The sensing device 100 and the mobile terminal 50 exchange data through wired and wireless communications. The control processor 130 includes, for example, a universal serial bus (USB) hub.

The sensing device 100 or the control processor 130 of the sensing device 100, and the mobile terminal 50 includes wireless Internet interfaces such as a wireless local area network (WLAN), a wireless fidelity (Wi-Fi) direct, a digital living network alliance (DLNA), a wireless broadband (Wi-Bro), a world interoperability for microwave access (WiMAX), and a high speed downlink packet access (HSDPA), for example, and short-range communication interfaces such as Bluetooth™, a radio frequency identification (RFID), an infrared data association (IrDA), a UWB, ZigBee, and a near field communication (NFC).

In an example, the mobile terminal 50 programs or controls the control processor 130 through an application programming interface (API).

The holder 150 holds the mobile terminal 50. The holder 150 includes the radio-wave based sensor module 110. The holder 150 holds the mobile terminal 50 in a form as shown in FIG. 1A or 1B.

Referring to FIG. 1B, the mobile terminal 50 to be connected to the holder 150 of the sensing device 100 is illustrated.

The holder 150 holds the mobile terminal 50 with a display of the mobile terminal 50 facing a user. The holder 150 is provided in a form of a plane as shown in FIG. 1A, or provided in a form of a stand as shown in FIG. 1B.

The holder 150 includes a portion to be connected to an attachment of the mobile terminal 50, and also include a structure to be attached or connected to a variety of electronic products or furniture.

The term "mobile terminal" used herein includes a typical mobile terminal equipped with a display, and all various mobile devices equipped with a basic communication module and/or a processor.

Figure 2:
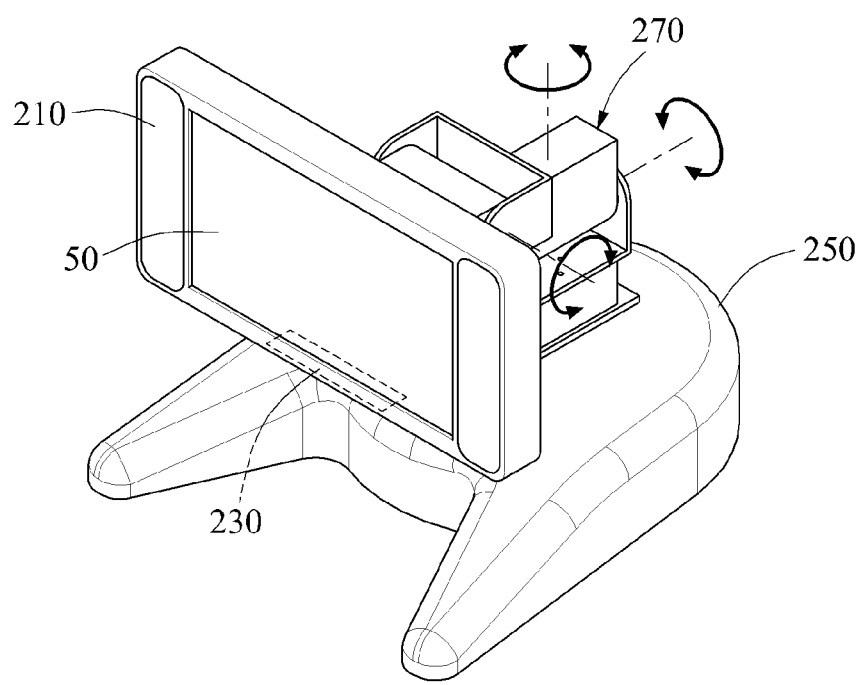
FIG. 2 is a diagram illustrating an example of a sensing device including a driver, in accordance with an embodiment.

FIG. 2 is a diagram illustrating an example of a sensing device including a driver, in accordance with an embodiment.

Referring to FIG. 2, a sensing device 200 includes at least one radio-wave based sensor module 210, a control processor 230, a holder 250, and a driver 270.

The descriptions of the at least one radio-wave based sensor module 110, the control processor 130, and the holder 150 of FIGS. 1A and 1B may be applicable to the at least one radio-wave based sensor module 210, the control processor 230, and the holder 250 and, thus, duplicated descriptions will be omitted for conciseness.

In one illustrative configuration, the driver 270 is a motor. The motor is, for example, a one or more-axis servo-motor such as a 3-axis servo-motor, a stepping motor, a linear motor, or a direct current (DC) motor.

The control processor 230 receives a control signal from the mobile terminal 50 to drive the motor, and controls the driver 270 based on the control signal.

In this example, the mobile terminal 50 held by the holder 250 of the sensing device 200 estimates information, for example, bio-information of a user, position information of the user, and position information of an obstacle, based on the sensed data received from the control processor 230.

When the estimated information, for example, the position information of the user, indicates a movement or a motion of the user, the mobile terminal 50 generates a control signal associated with the drive of the motor and transmits the generated control signal to the sensing device 200 to control the driver 270.

In an example, the sensing device 200 further includes a mover (not shown) including at least one a wheel or a propeller configured to be operated by the driver 270. The control processor 230 receives a control signal associated with the drive of the motor and an operation of the mover from the mobile terminal 50, and controls the driver 270 and the mover based on the control signal.

For example, when the user moves out of a sensing area of the radio-wave based sensor module 210, the radio-wave based sensor module 210 transmits sensed data related to a motion of the user to the mobile terminal 50. The mobile terminal 50 estimates position information of the user based on the sensed data. When the estimated position information of the user indicates that the user has moved out of the sensing area of the radio-wave based sensor module 210, the mobile terminal 50 generates a control signal associated with a drive of the motor and an operation of the mover and transmits the generated control signal to the sensing device 200.

Based on the control signal transmitted from the mobile terminal 50, the control processor 230 controls the driver 270 and the mover to track the user. When the user is within the sensing area of the radio-wave based sensor module 210 after the tracking, the radio-wave based sensor module 210 senses a biosignal of the user or a position of the user.

Figure 3A:
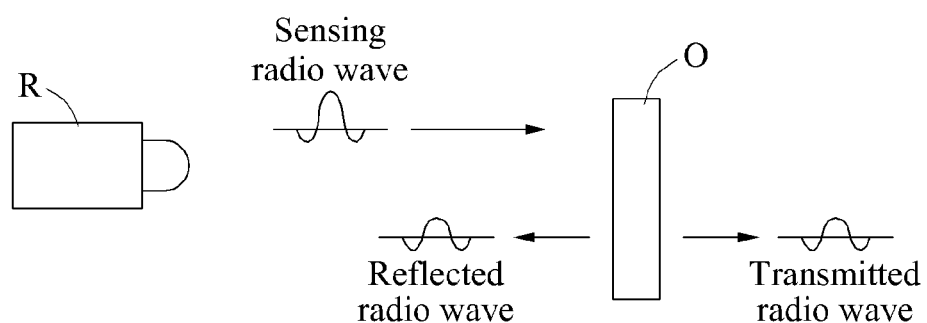
FIGS. 3A and 3B are diagrams illustrating an example of an operation of a radio-wave based sensor module, in accordance with an embodiment.
Figure 3B:
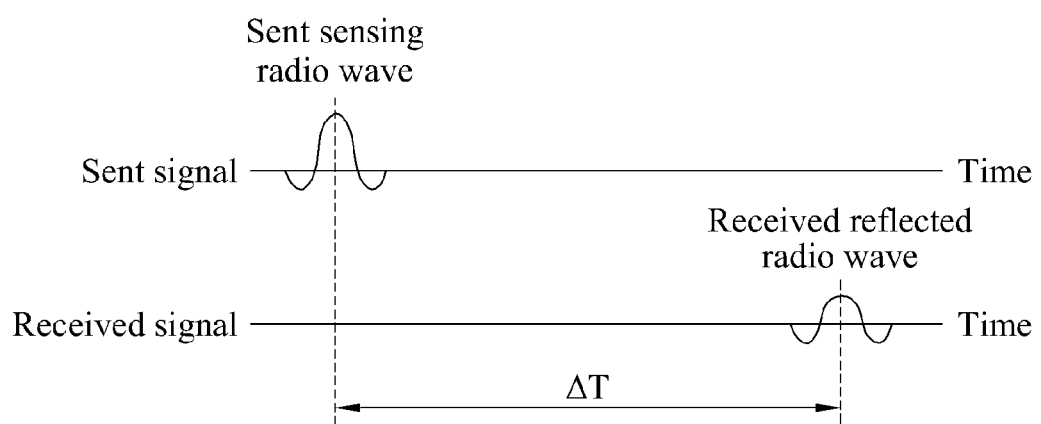

FIGS. 3A and 3B are diagrams illustrating an example of an operation of a radio-wave based sensor module, in accordance with an embodiment.

Referring to FIGS. 3A and 3B, an operation of a radar module R as an example of a radio-wave based sensor module is illustrated.

As illustrated in FIG. 3A, the radar module R sends sensing radio waves in all directions or in one direction through a transmission antenna (not shown). The sensing radio waves output from the radar module R proceed in all directions or in one direction. When the sensing radio waves proceeding in all directions meet an obstacle O, a portion of the sensing radio waves may be reflected from the obstacle O, and a remaining portion of the sensing radio waves may be transmitted through the obstacle O. The radio waves reflected from the obstacle O may be returned to and received at the radar module R.

As illustrated in FIG. 3B, a time difference ΔT occurs between a transmission time that a sensing signal is sent from the radar module R to a reception time that a signal reflected from the obstacle O is received at the radar module R. The time difference is referred to as a "reflected signal sensing time".

The reflected signal sensing time ΔT refers to a time of flight (TOF) taken for the sensing signal sent from the radar module R to be reflected from the obstacle O and returned.

In an example, a distance from the radar module R to the obstacle O is detected based on the reflected signal sensing time ΔT. In detail, the distance from the radar module R to the obstacle O is calculated by dividing a product of the time difference ΔT and a speed of a radio wave, for example, 300,000 kilometers per second (km/s), by "2". In this example, the sensing signal sent or transmitted from the radar module R is illustrated in FIGS. 4A and 4B.

Figure 4A:
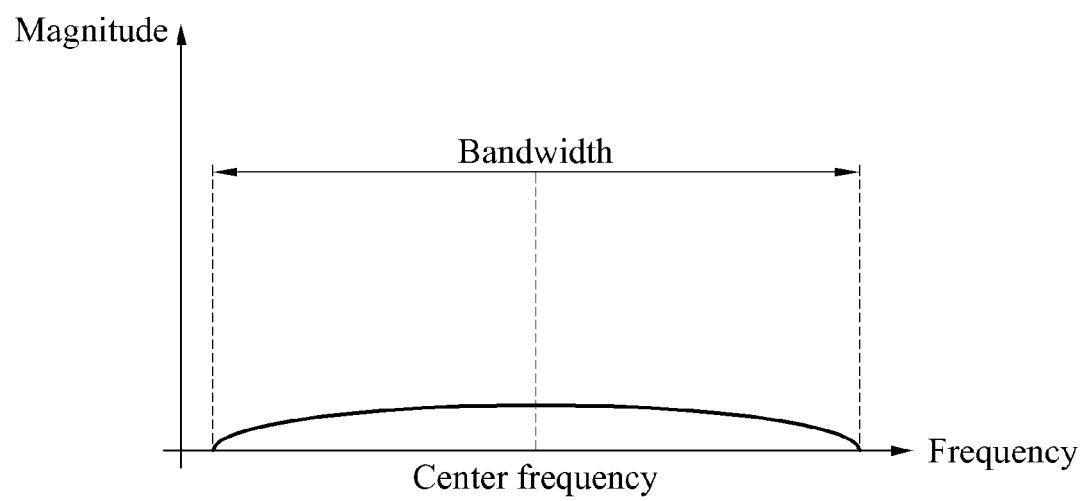
FIGS. 4A and 4B are graphs illustrating an example of a spectrum and a waveform of a sensing signal sent by a radio-wave based sensor module, in accordance with an embodiment.
Figure 4B:
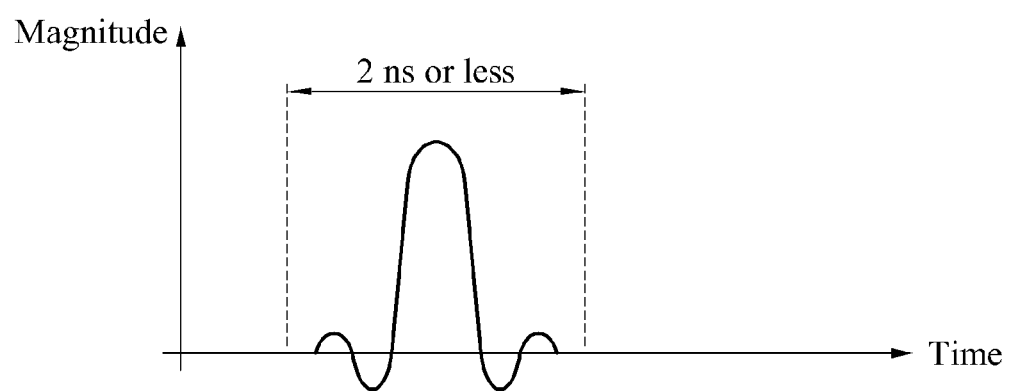

FIGS. 4A and 4B are graphs illustrating an example of a spectrum and a waveform of a sensing signal sent by a radio-wave based sensor module, in accordance with an embodiment.

As illustrated in FIG. 4A, a sensing signal sent by or transmitted from the radar module R is an impulse signal having a pulse width of a few nanoseconds to less than a nanosecond. The impulse signal is generated using a delay characteristic of a digital logic gate.

The impulse signal has a frequency spectrum in which energy is distributed in a relatively wide frequency band. In this example, energy is relatively low at each frequency and, thus, a crosstalk with other radio communication devices may be prevented.

In particular, as illustrated in FIG. 4B, a communication method using an impulse signal with a bandwidth greater than or equal to 25% of a center frequency is referred to as a UWB communication method, and a radar module using such an impulse signal is referred to as a UWB radar module. A radio-wave based sensor module included in a sensing device employs such a UWB radar module. However, examples are not limited thereto. The radio-wave based sensor module may also employ a radar module using a typical radio wave.

Figure 5B:
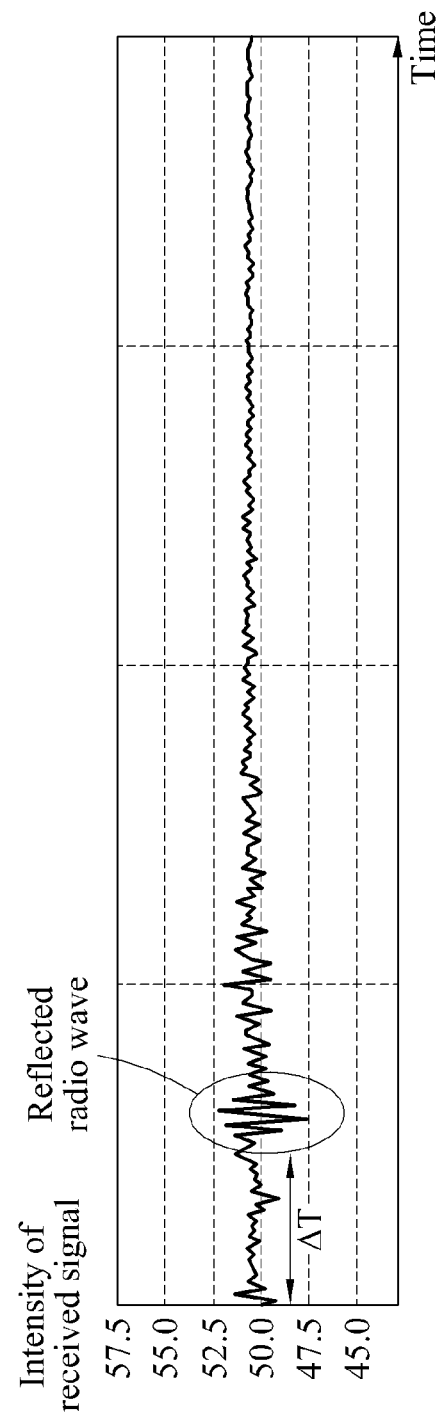

The radar module R transmitting an impulse signal as a sensing radio wave A and the signal reflected from the obstacle O and returned to the radar module R are illustrated in FIGS. 5A and 5B.

FIGS. 5A and 5B are graphs illustrating examples of signals received after a sensing radio wave is sent from a radio-wave based sensor module, in accordance with an embodiment.

The graph of FIG. 5A illustrates a signal received at the radar module R in a case in which the obstacle O is absent. The graph of FIG. 5B illustrates a signal received by the radar module R in a case in which the obstacle O is present.

In a case in which the obstacle O is absent, the radar module R receives a signal with interference signals generated around the radar module R, as shown in FIG. 5A. In this example, a relatively small intensity or low amplitude of the signal is received constantly.

In a case in which an obstacle O is present, the radar module R receives a pulse signal with a significant amplitude, as shown in FIG. 5B, when a predetermined time ΔT elapses after transmission of a sensing signal. A change in the amplitude of the received signal indicates that a signal is reflected from the obstacle O and is received at the radar module R.

When a change in the amplitude of the received signal is sensed, the radar module R detects a time used until a change in an amplitude of a signal received reflected from the obstacle O after the sensing signal is sent from the radar module R, for example, a reflected signal sensing time ΔT, is detected. For example, when an intensity of the signal received at the radar module R is greater than or equal to a reference value, a maximum value of the received signal is detected at the radar module R, and a time from the time that the signal is reflected from the obstacle O to a time that the signal at which the maximum value is detected at the radar module R is determined to be the reflected signal sensing time ΔT.

As described above, in a case in which an obstacle O is present, in addition to the amplitude of the signal received at the radar module R, a phase and a frequency of the received signal also changes. In detail, the radar module R receives a signal with a different phase or a different frequency compared to a case in which an obstacle O is absent after the sensing signal is output. In this example, the radar module R detects a time at which the phase or the frequency changes, for example, the reflected signal sensing time ΔT, by sensing a change in the phase or the frequency of the received signal.

When the radar module R detects the reflected signal sensing time ΔT, a control processor (refer to the control processor 130 of FIG. 1A) transmits the detected reflected signal sensing time ΔT to a mobile terminal.

The mobile terminal calculates a distance between the radar module R and the obstacle O based on the reflected signal sensing time ΔT received from the control processor of the sensing device.

The radar module R detects the distance between the radar module R and the obstacle O based on a time-of-flight (TOF), for example, a time difference between a transmission of the sensing signal and a reception of the reflected signal. However, examples are not limited thereto. In an alternative configuration, the radar module R detects the distance between the radar module R and the obstacle O based on an amount of energy of the reflected signal. For instance, the radar module detects the amount of energy of the reflected signal based on a reduction in an amount of energy of the reflected signal with respect to a proceeding distance between the radar module R and the obstacle O, and calculates a distance corresponding to the detected amount of energy.

Figure 6A:
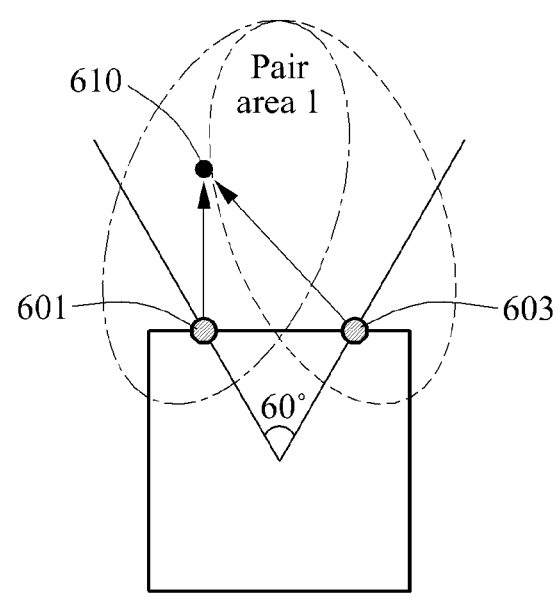
FIGS. 6A and 6B are diagrams illustrating an example of a method of sensing a target using a radio-wave based sensor module, in accordance with an embodiment.
Figure 6B:
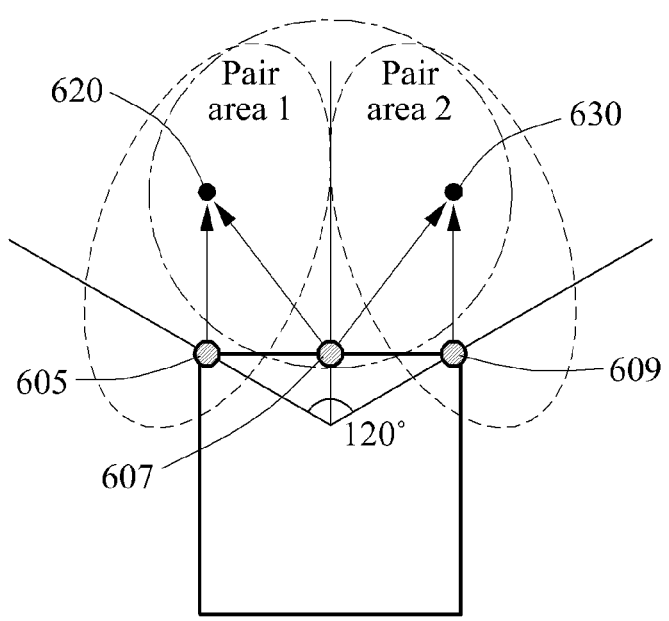

FIGS. 6A and 6B are diagrams illustrating an example of a method of sensing a target using a radio-wave based sensor module, in accordance with an embodiment.

Referring to FIG. 6A, a case in which two radio-wave based sensor modules 601 and 603 included in a sensing device sense a target 610 is illustrated.

When the radio-wave based sensor modules 601 and 603 are disposed at a predetermined interval, areas in which the radio-wave based sensor modules 601 and 603 send sensing signals overlap and form a sensing area, for example, pair area 1. The radio-wave based sensor modules 601 and 603 sense the target 610 within the sensing area.

The radio-wave based sensor modules 601 and 603 transmit a result of sensing the target 610 in the sensing area to a mobile terminal through a control processor. The mobile terminal estimates position information of the target 610 based on data sensed by the radio-wave based sensor modules 601 and 603. For example, the position information of the target 610 is provided in a form of coordinates (x, y).

The mobile terminal estimates the position information of the target 610, for example, using triangulation. The target 610 is an inanimate object acting as an obstacle, for example, a wall or a bookshelf, or a living thing to be detected, for example, a human or a Puppy.

In accordance with an embodiment, when the two radio-wave based sensor modules 601 and 603 are used, two-dimensional (2D) positions (x, y) of at least two targets are also detected.

Referring to FIG. 6B, a case in which three radio-wave based sensor modules 605, 607, and 609 included in a sensing device sense targets 620 and 630 is illustrated.

The radio-wave based sensor modules 605, 607, and 609 are disposed at predetermined intervals, for example, at intervals of 60 degrees, in a front portion of the sensing device. In accordance with one configuration, as shown in FIG. 6B, the radio-wave based sensor modules 605, 607, and 609 are positioned equidistant from each other. In accordance with another configuration, the radio-wave based sensor modules 605, 607, and 609 are positioned at different distances from each other. For instance, the radio-wave based sensor modules 605 and 607 are positioned closer to each other than the radio-wave based sensor modules 607 and 609.

The radio-wave based sensor modules 605, 607, and 609 transmit sensing signals in all directions. Areas in which the radio-wave based sensor modules 605, 607, and 609 transmit the sensing signals overlap and form sensing areas, for example, pair area 1 and pair area 2. The sensing areas are areas in which the radio-wave based sensor modules 605, 607, and 609 detect position information of the targets 620 and 630.

Similar to the example of FIG. 6A, the radio-wave based sensor modules 605, 607, and 609 transmit a result of sensing the targets 620 and 630 in the sensing areas to a mobile terminal through a control processor. The mobile terminal estimates the position information of the targets 620 and 630 based on data sensed from the radio-wave based sensor modules 605, 607, and 609. For example, the position information of the targets 620 and 630 is provided in a form of coordinates (x, y, z).

When the three radio-wave based sensor modules 605, 607, and 609 are used, 2D positions of the plurality of targets 620 and 630 are detected or three-dimensional (3D) positions (x, y, z) of the targets 620 and 630 are detected. As a number of radio-wave based sensor modules increases, an accuracy of recognizing a 2D position of a target increases. In an example, similar to the target sensing, a position of a moving object or human is tracked using triangulation.

The method of sensing a target, as described above, senses a surface of an object closest to radio-wave based sensor modules when various objects are present in a sensing area. Position tracking tracks a position of a predetermined object or human in real time.

When a target moves out of a sensing area of at least two radio-wave based sensor modules, it may be difficult to sense a biosignal of the target and track a position of the target. In this example, by configuring a driver and a mover in the sensing device including the radio-wave based sensor modules, a position of a moving human is tracked or a biosignal of the moving human is sensed. In this example, the driver includes a one or more-axis servo-motor. The mover includes at least one wheel or propeller operated by the driver.

In an example, the sensing device tracks a position of a target by driving a motor based on a control signal received from a mobile terminal when the target moves and senses a biosignal of the target, for example, a human, in a static state. In this example, the sensing device uses a plurality of antennas to form a relatively wide beam for tracking, and uses an antenna to form a relatively narrow beam to sense precise bio-information, for example, a breath and a heart rate. To form a relatively narrow beam, a guide composition of a metallic material may be added to the sensing device.

Figure 7:
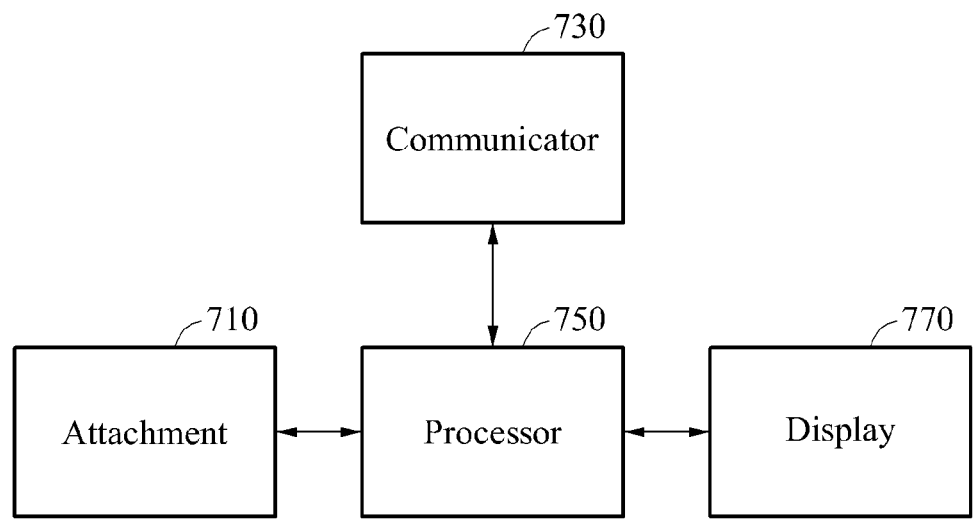
FIG. 7 is a block diagram illustrating an example of a mobile terminal, in accordance with an embodiment.

FIG. 7 is a block diagram illustrating an example of a mobile terminal, in accordance with an embodiment.

Referring to FIG. 7, a mobile terminal 700 to be attached to a sensing device includes a communicator 730 and a processor 750.

An attachment 710 is attached to the sensing device. In this example, the sensing device includes at least one radio-wave based sensor module.

The communicator 730 receives sensed data from the sensing device.

The processor 750 processes the sensed data received through the communicator 730.

The processor 750 estimates at least one of bio-information of a user, position information of the user, and position information of an obstacle based on the sensed data received through the communicator 730.

The processor 750 generates emergency medical information based on the estimated bio-information. The communicator 730 transmits the emergency medical information to a medical institution server. An example of the processor 750 generating emergency medical information based on estimated bio-information will be described with reference to FIG. 10.

When the estimated position information of the user indicates a movement of the user, the processor 750 generates a control signal to drive a motor and control a driver included in the sensing device. The communicator 730 transmits the control signal generated by the processor 750 to the sensing device.

The communicator 730 additionally receives, from the sensing device, identification information to identify a target to be connected to the sensing device. The processor 750 processes the sensed data based on the identification information.

In this example, the identification information includes a characteristic code and a control code to be used to control the target. The characteristic code indicates that the target to be connected to the sensing device is, for example, a robot, a drone, an air conditioner, a television (TV), a refrigerator, a camera, a vehicle, an audio system, or a medical device.

The mobile terminal 700 further includes a display 770 configured to display the estimated at least one information. An example of a mobile terminal including a display, the mobile terminal being attached to a sensing device will be described with reference to FIG. 8.

Figure 8:
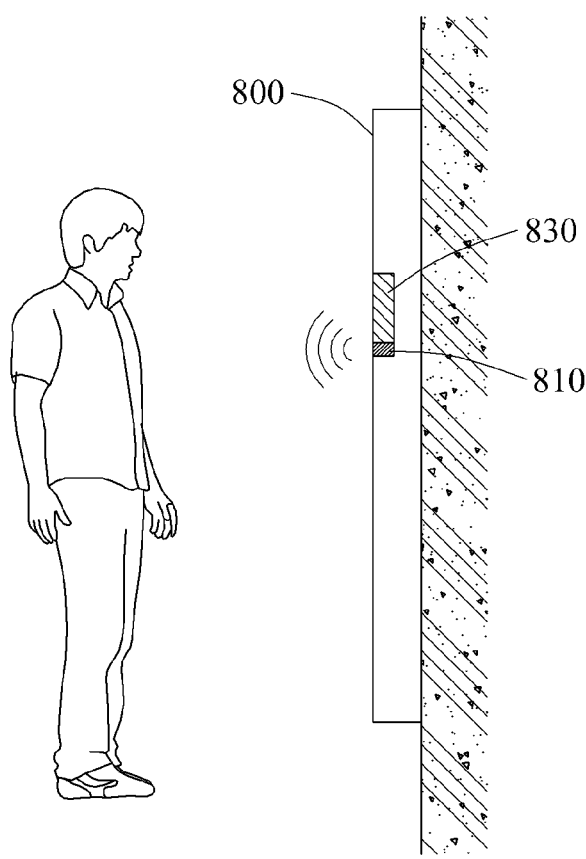
FIG. 8 is a diagram illustrating an example of the mobile terminal attached to a sensing device, in accordance with an embodiment.

FIG. 8 is a diagram illustrating an example of a mobile terminal attached to a sensing device, in accordance with an embodiment.

Referring to FIG. 8, a sensing device 810 and a mobile terminal 830 are provided on a wall on which a mirror 800 is positioned. In this example, an attachment (refer to the attachment 710 of FIG. 7) of the mobile terminal 830 is attached or connected to a holder (refer to the holder 150 of FIG. 1A) of the sensing device 810.

For example, a user gets close to the mirror 800 on the wall on which the sensing device 810 and the mobile terminal 830 are mounted.

The sensing device 810 senses a breath and a heartbeat of the user, and transmits the sensed data to the mobile terminal 830.

The mobile terminal 830 estimates bio-information of the user based on the sensed data. The mobile terminal 830 estimates the bio-information of the user, for example, estimates whether a breath of the user is normal, slow or fast, or regarding whether a heartbeat of the user is normal or irregular, based on the sensed data. The mobile terminal 830 displays the estimated bio-information of the user on a display.

In an example, the sensing device 810 is spaced apart from the mobile terminal 830 in an inner portion of a car seat. The sensing device 810 senses bio-information of a child or a patient sitting on the car seat, and transmits the sensed data to the mobile terminal 830. A user sitting on a drivers seat may verify the bio-information of the child or the patient sitting on the car seat through the mobile terminal 830, without looking back or away from the road.

Figure 9:
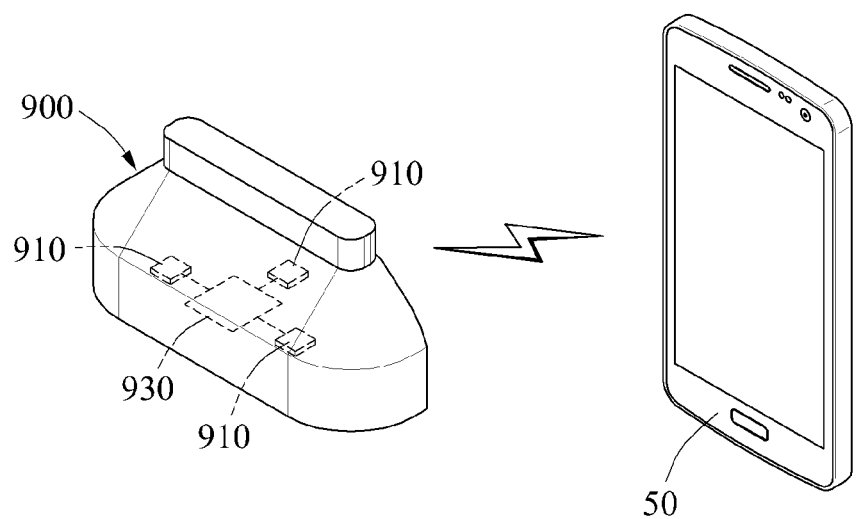
FIG. 9 is a diagram illustrating an example of a sensing device spaced apart from a mobile terminal, in accordance with an embodiment.

FIG. 9 is a diagram illustrating an example of a sensing device spaced apart from a mobile terminal, in accordance with an embodiment.

Referring to FIG. 9, a sensing device 900 includes at least one radio-wave based sensor module 910 and a control processor 930.

The control processor 930 transmits data sensed by the at least one radio-wave based sensor module 910 to a mobile terminal 50 through wireless communication or short-range communication. The mobile terminal 50 may be spaced apart from the sensing device 900.

The mobile terminal 50 spaced apart from the sensing device 900 includes, for example, wireless Internet interfaces such as a WLAN, a Wi-Fi direct, a DLNA, a WiBro, a WiMAX, and an HSDPA, for example, and short-range communication interfaces such as Bluetooth™, an RFID, an IrDA, a UWB, a ZigBee, and an NFC.

The sensing device 900 includes the aforementioned wireless Internet interfaces and short-range communication interfaces.

The sensing device 900 further includes a driver (not shown) configured to drive a motor. The control processor 930 receives a control signal from the mobile terminal 50 to drive the motor and control the driver based on the control signal.

The sensing device 900 further includes a mover (not shown) including at least one wheel or propeller configured to operate by the driver. In this example, the control processor 930 receives a control signal from the mobile terminal 50 to drive the motor and operate the mover. The control processor 930 controls the driver and the mover based on the control signal.

In an example, a function of a processor of the mobile terminal 50 is performed by the control processor 930 of the sensing device 900. The control processor 930 of the sensing device 900 estimates bio-information of a user, position information of the user, and position information of an obstacle by processing data sensed by the radio-wave based sensor module 910 of the sensing device 900. Further, the control processor 930 processes the sensed data based on identification information to be used to identify a target to be connected to the sensing device 900.

Hereinafter, examples of a sensing device spaced apart from a mobile terminal will be described with reference to FIGS. 10 through 14. However, examples are not limited thereto. In an example, a mobile terminal is held in a sensing device. In this example, the mobile terminal is a mobile terminal provided in a typical form equipped with a display as described above, or a mobile device provided in a form excluding a display, but equipped with a basic communication module and/or a processor.

Figure 10:
FIG. 10 is a diagram illustrating an example of a sensing device that senses a biosignal of a user, in accordance with an embodiment.
Figure 10:
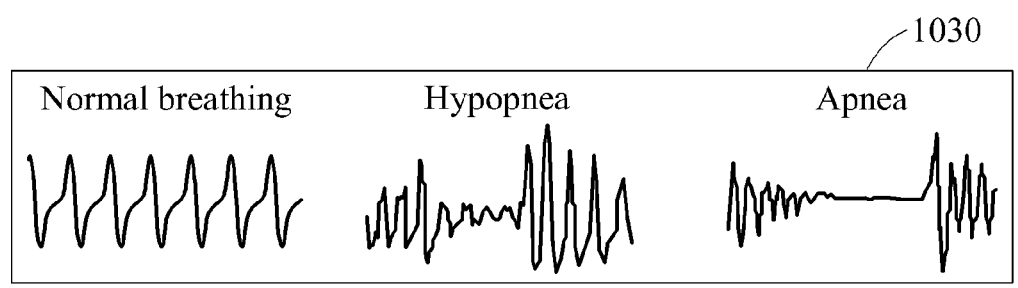

FIG. 10 is a diagram illustrating an example of a sensing device that senses a biosignal of a user, in accordance with an embodiment.

Referring to FIG. 10, a sensing device 1010 senses a breath of a user, a heart rate of the user, and a minute motion of an inner or outer portion of a body of the user based on a sensing radio wave output from at least one radio-wave based sensor module.

As illustrated in FIG. 10, when the sensing device 1010 is put on a periphery of a bed, the sensing device 1010 senses data related to a heartbeat, a breathing state, and a sleeping state of the user.

The data sensed by the sensing device 1010 is transmitted to a mobile terminal spaced apart from the sensing device 1010.

For example, when the data sensed by the sensing device 1010 corresponds to breathing data, the mobile terminal estimates a breathing state of the user based on the breathing data. The breathing state of the user is estimated as shown in a graph 1030. The breathing state of the user may be classified into, for example, a normal breathing state, a hypopnea state, and an apnea state.

When the breathing data sensed by the sensing device 1010 is estimated to correspond to the hypopnea state or the apnea state, the mobile terminal generates emergency medical information, and transmits the emergency medical information to a medical institution server or to any other server programmed or configured to receive notifications with emergency medical information. In this example, the emergency medical information includes a breathing state or a heartbeat state of the user, an address of the user, contact details of a family, and nearby medical institution information.

The mobile terminal verifies the nearby medical institution information, for example, a position of a nearby medical institution, based on a position of the mobile terminal using a global positioning system (GPS) included in the mobile terminal, and generates the emergency medical information based on the nearby medical institution information.

In accordance with an example, the medical institution server receiving the emergency medical information from the mobile terminal makes a phone call based on the contact details of the family included in the emergency medical information, and instructs the nearby medical institution to send an ambulance.

Figure 11:
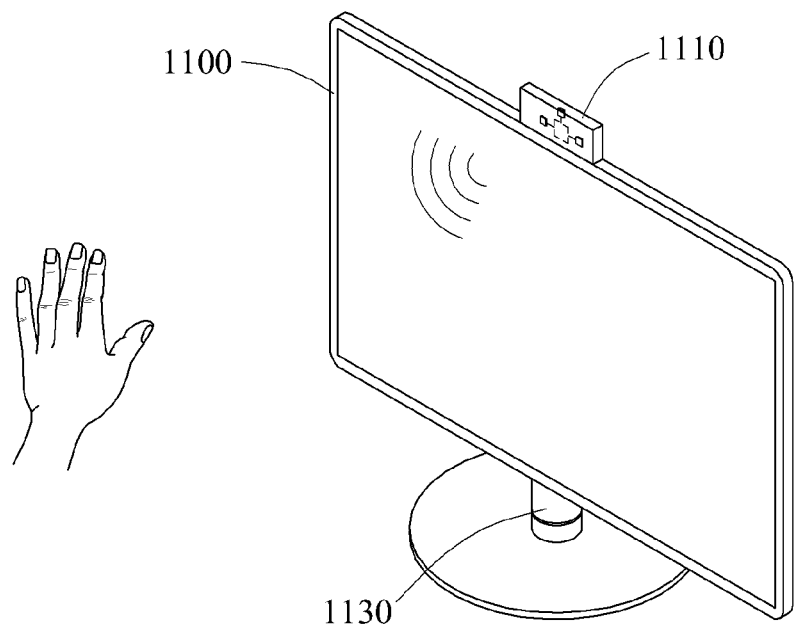
FIG. 11 is a diagram illustrating an example of a sensing device connected to a television (TV), in accordance with an embodiment.

FIG. 11 is a diagram illustrating an example of a sensing device connected to a TV, in accordance with an embodiment.

Referring to FIG. 11, a sensing device 1110 connected to a front portion of a TV 1100 is illustrated.

The sensing device 1110 includes, for example, a single radio-wave based sensor module, and senses a movement of a user or a motion of a body part of the user in front of a screen of the TV 1100. For example, the sensing device 1110 senses a hand gesture of the user in a one-dimensional (1D), 2D, or 3D form.

The sensing device 1110 senses a movement of the user from left to right in front of the screen of the TV 1100. The mobile terminal receiving sensed data from the sensing device 1110 estimates position information of the user based on the sensed data, and generates a signal to control a driver 1130 based on the estimated position information.

In this example, the signal to control the driver 1130 is a control signal to move the TV 1100 from left to right so that a direction of the screen of the TV 1100 matches a moving direction of the user.

Further, a control processor (not shown) of the sensing device 1110 transmits to the mobile terminal identification information indicating that a target connected to the sensing device 1110 is a TV. The mobile terminal processes the sensed data received from the sensing device 1110 based on the identification information.

For example, the mobile terminal verifies that a position of a user is getting away from the sensing device 1110 based on the data sensed by the sensing device 1110, and verifies that a target connected to the sensing device 1110 is the TV 1100 based on a characteristic code included in identification information transmitted by the sensing device 1110.

Based on the data sensed by the sensing device 1110, when the mobile terminal verifies that the position information of the user is getting away from the sensing device 1110, the mobile terminal generates a control signal to increase a volume of the TV 1100 connected to the sensing device 1110 or a control signal to turn-off the power to the TV 1100 based on a control code to control the TV 1100 included in the identification information. The mobile terminal transmits to the TV 1100 the control signal to increase the volume of the TV 1100 or the control signal to turn-off the power to the TV 1100.

Based on the data sensed by the sensing device 1110, when the mobile terminal verifies that the user shakes a body part, for example, a hand, the mobile terminal generates a control signal to change a channel of a program being broadcast on the TV 1100 connected to the sensing device 1110 to a previous channel or a subsequent channel.

When a distance from a sofa disposed in front of the screen of the TV 1100 is within a sensing range of the radio-wave based sensor module, the sensing device 1110 senses data related to a breath or a pulse of a human on the sofa and transmits the sensed data to the mobile terminal.

The mobile terminal verifies whether the human on the sofa is sleeping based on the sensed data received from the sensing device 1110. When the mobile terminal verifies that the human on the sofa is sleeping, the mobile terminal generates a control signal to turn-off the power to the TV 1100.

Figure 12:
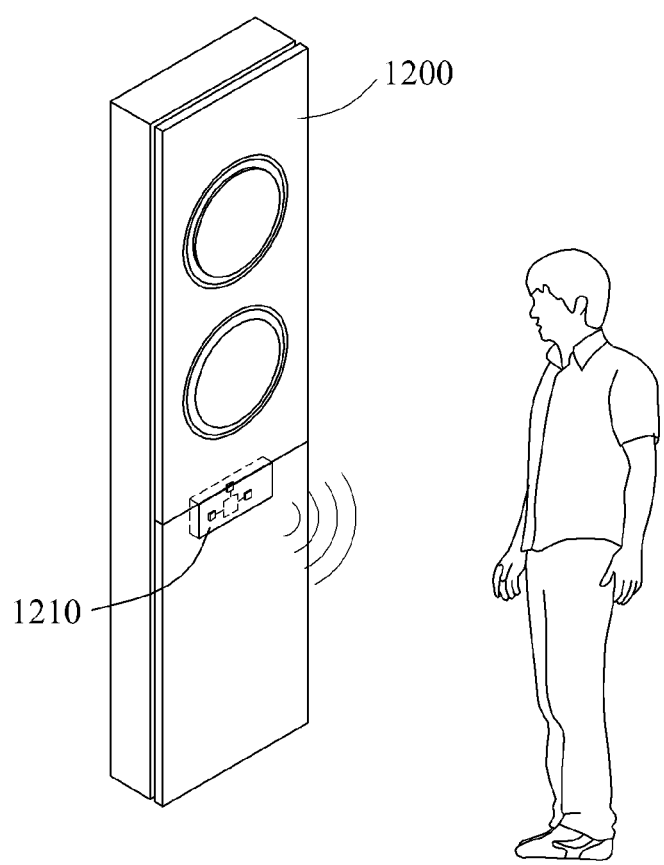
FIG. 12 is a diagram illustrating an example of a sensing device connected to an air conditioner, in accordance with an embodiment.

FIG. 12 is a diagram illustrating an example of a sensing device connected to an air conditioner, in accordance with an embodiment.

Referring to FIG. 12, a sensing device 1210 connected to an air conditioner 1200 is illustrated.

The sensing device 1210 includes, for example, at least one radio-wave based sensor module, and senses a position of a user based on a front portion of the air conditioner 1200. The sensing device 1210 transmits the sensed data to a mobile terminal. In this example, the sensed data is information to be used to calculate the position of the user, for example, a distance between the user and the air conditioner 1200, and an angle at which the user is positioned from a center of the air conditioner 1200.

The mobile terminal receiving the sensed data from the sensing device 1210 estimates position information of the user. Further, the mobile terminal verifies that a target connected to the sensing device 1210 is the air conditioner 1200 based on a characteristic code included in identification information transmitted by the sensing device 1210. The mobile terminal processes the sensed data based on the identification information.

The mobile terminal generates an air conditioner control signal to change a direction of wind based on the position information estimated using a control code included in the identification information. The mobile terminal transmits the air conditioner control signal to the air conditioner 1200.

Figure 13:
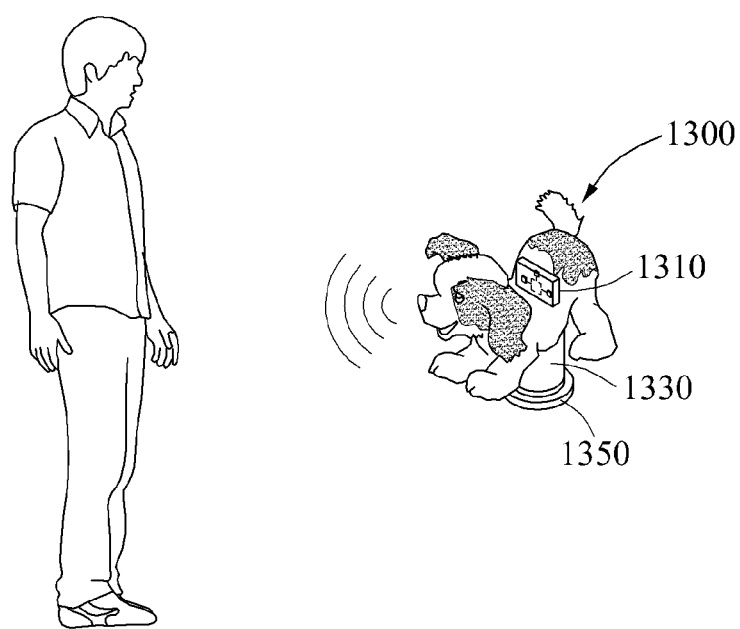
FIG. 13 is a diagram illustrating an example of a sensing device connected to a robot, in accordance with an embodiment.

FIG. 13 is a diagram illustrating an example of a sensing device connected to a robot, in accordance with an embodiment.

Referring to FIG. 13, a sensing device 1310 connected to a robot 1300 is illustrated.

The robot 1300 includes a driver 1330 configured to drive a motor, and a mover 1350 including at least one wheel operated by the driver 1330. The robot 1300 tracks a motion of a user using the driver 1330 and the mover 1350.

When the sensing device 1310 is connected to the robot 1300, the sensing device 1310 transmits to a mobile terminal identification information indicating that a target connected to the sensing device 1310 is the robot 1300. The mobile terminal verifies that the sensing device 1310 is connected to the robot 1300 based on a characteristic code included in the identification information.

The sensing device 1310 includes, for example, at least one radio-wave based sensor module, and senses a movement of a user or a motion of a body part on a periphery of the robot 1300. In this example, the robot 1300 is provided in various shapes, for example, a doll, a bag, and a toy. The sensing device 1310 is attached to an outer portion or an inner portion of the robot 1300.

For example, the sensing device 1310 senses a movement of the user from left to right of the robot 1300. The mobile terminal receiving sensed data from the sensing device 1310 estimates position information of the user based on the sensed data, and generates a signal to control the driver 1330 and the mover 1350 of the robot 1300 based on the estimated position information. In this example, the mobile terminal processes the sensed data received from the sensing device 1310 based on the identification information.

The user, the sensing device 1310, or the robot 1300 includes a device configured to measure a distance through radio-wave based communication, for example, UWB, WiFi, and Bluetooth low energy (BLE). In this example, although the user moves out of a sensing area, the sensing device 1310 or the robot 1300 autonomously drives toward the user using a radio wave. For example, the user is a disabled person carrying the sensing device 1310 or the device configured to measure a distance through radio-wave based communication.

Figure 14:
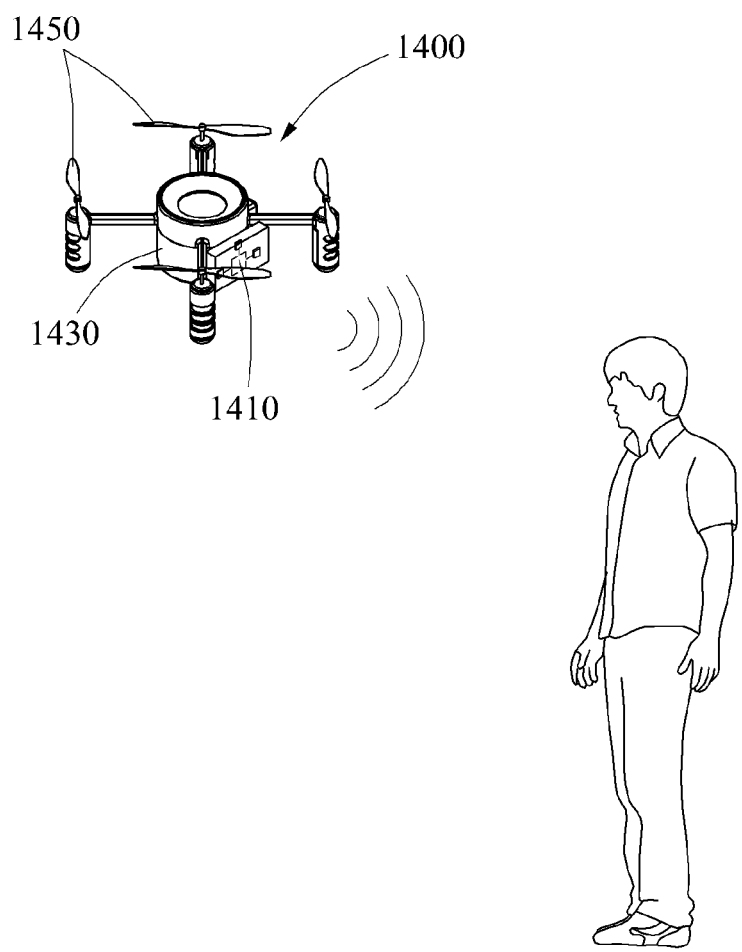
FIG. 14 is a diagram illustrating an example of a sensing device connected to a drone, in accordance with an embodiment.

FIG. 14 is a diagram illustrating an example of a sensing device connected to a drone, in accordance with an embodiment.

Referring to FIG. 14, a sensing device 1410 connected to a drone 1400 is illustrated.

The drone 1400 includes a driver 1430 configured to drive a motor, and a mover 1450 including at least one propeller configured to be operated by the driver 1430.

When the sensing device 1410 is connected to the drone 1400, the sensing device 1410 transmits to a mobile terminal identification information indicating that a target connected to the sensing device 1410 is the drone 1400. The mobile terminal verifies that the sensing device 1410 is connected to the drone 1400 based on a characteristic code included in the identification information.

The sensing device 1410 includes, for example, at least one radio-wave based sensor module, and simultaneously senses a position of a user and a position of an obstacle on a periphery of the drone 1400.

For example, the sensing device 1410 senses a movement of the user walking under the drone 1400. The mobile terminal receiving the sensed data from the sensing device 1410 estimates position information of the user based on the sensed data, and generates a signal to control the driver 1430 and the mover 1450 of the drone 1400 based on the estimated position information. The mobile terminal generates the signal to control the driver 1430 and the mover 1450 using a control code included in the identification information.

In an example, the sensing device 1410 is provided in a form of the robot 1300 of FIG. 13 or the drone 1400 including a driver and a mover.

Figure 15:
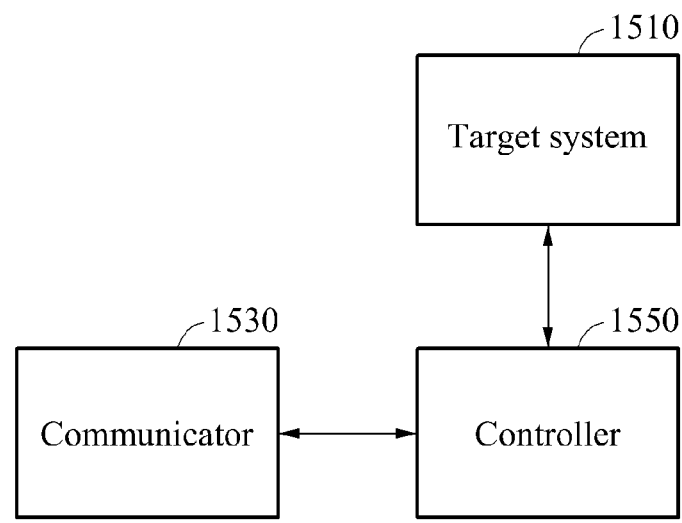
FIG. 15 is a block diagram illustrating an example of a mobile terminal, in accordance with an embodiment.

FIG. 15 is a block diagram illustrating an example of a mobile terminal, in accordance with an embodiment.

Referring to FIG. 15, a mobile terminal 1500 includes a target system 1510, a communicator 1530, and a controller 1550.

The target system 1510 is included in a mobile terminal 1500. In one illustrative example, "being included" refers to being included in an internal portion of the mobile terminal 1500, and also refers to being externally connected to the mobile terminal 1500 and driven.

The target system 1510 includes, for example, an audio system including a speaker included in the mobile terminal 1500, or an automated external defibrillator (AED) system to be connected to the mobile terminal 1500 and driven.

The communicator 1530 receives sensed data from a sensing device spaced apart from the mobile terminal 1500. The sensing device includes at least one radio-wave based sensor module.

The controller 1550 estimates at least one of a gesture and a motion of a user based on the sensed data, and controls the target system 1510 based on at least one of the gesture and the motion. In one illustrative example, the "gesture" is a static form performed by a body part of the user. Further, the "motion" is a dynamic motion performed by at least a body part of the user.

The controller 1550 controls an operation of the target system 1510 by verifying, based on the sensed data, whether the gesture or the motion of the user is getting away from or close to the sensing device or whether the gesture or the motion of the user moves laterally with respect to the sensing device.

For example, when the target system 1510 corresponds to an audio system including a speaker, the controller 1550 may control, based on at least one of the gesture and the motion of the user, operations of, for example, playing music on the audio system, stopping or pausing playback of music, controlling a volume of the speaker, playing back a previous or subsequent song, and playing a melody to make a musical rhythm based on a position of a hand.

In one example, when the target system 1510 corresponds to an automated external defibrillator (AED) system, based on at least one of the gesture and the motion of the user, the controller 1550 controls, operations of charging the AED system and performing a defibrillation.

The communicator 1530 also receives from the sensing device identification information identifying a target to be connected to the sensing device. In this example, the controller 1550 processes the sensed data based on the identification information. The controller 1550 processes the sensed data using a control code included in the identification information.

Figure 16:
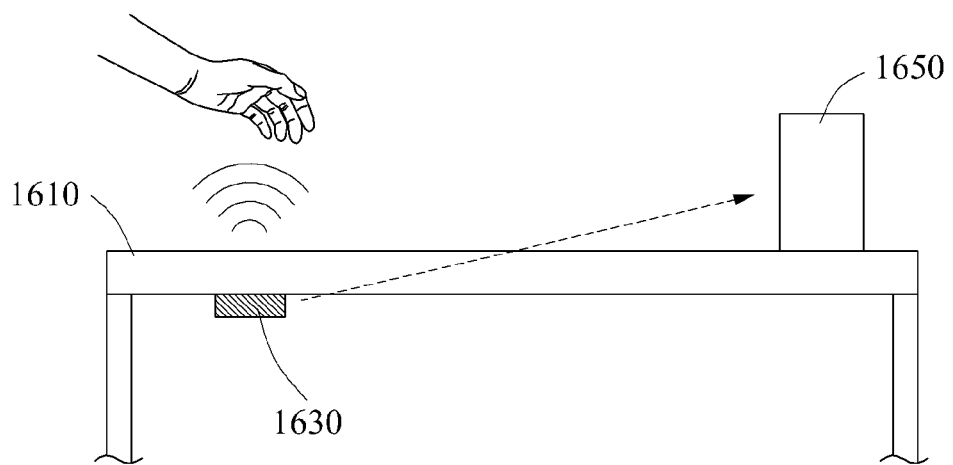
FIG. 16 is a diagram illustrating an example of a mobile terminal that controls a target system based on data sensed by a sensing device, in accordance with an embodiment.

FIG. 16 is a diagram illustrating an example of a mobile terminal that controls a target system based on data sensed by a sensing device, in accordance with an embodiment.

Referring to FIG. 16, a sensing device 1630 attached to a bottom of a desk 1610, and a mobile terminal 1650 spaced apart from the sensing device 1630 are illustrated. The mobile terminal 1650 includes an audio system including a speaker.

The sensing device 1630 attached to the bottom of the desk 1610 senses a movement of a body, for example, a hand, of a user above the desk 1610. The sensing device 1630 senses the movement using a sensing radio wave and a reflected radio wave, and transmits the sensed data to the mobile terminal 1650.

The mobile terminal 1650 estimates a gesture or a motion of the hand based on the sensed data received from the sensing device 1630, and controls the audio system including the speaker based on at least one of the gesture and the motion.

The mobile terminal 1650 verifies using the sensed data, whether the gesture or the motion of the user is getting away from or getting close to the sensing device 1630. When the gesture or the motion is getting away from the sensing device 1630, the mobile terminal 1650 controls the audio system to play or pause music.

For example, when the gesture or the motion of the user is sensed within a sensing range of the sensing device 1630, the mobile terminal 1650 controls the audio system to play music based on the sensed data.

When the user moves a hand of the user away from the desk 1610 while music is being played, the mobile terminal 1650 controls the audio system to pause the music based on the sensed data.

Further, the mobile terminal 1650 controls a volume of the speaker by verifying based on the sensed data, whether the gesture or the motion of the user is getting away from or close to the sensing device 1630.

For example, when it is verified that the gesture or the motion of the user moves in a vertical direction with respect to the sensing device 1630, the mobile terminal 1650 adjusts the volume of the speaker. When the sensing device 1630 includes at least one radio-wave based sensor module, the sensing device 1630 produces various melodies by sensing a position of a hand of the user.

The various modules, elements, and methods described above may be implemented using one or more hardware components, one or more software components, or a combination of one or more hardware components and one or more software components.

The apparatuses, holders, communicators, attachments, modules, devices, and other components illustrated in FIGS. 1A through 16 that perform the operations described herein are implemented by hardware components. Examples of hardware components include processors, modules, controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein.

The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described herein with respect to FIGS. 1A through 16 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A mobile terminal, comprising:
an attachment configured to be attached to a sensing device, the sensing device comprising a radio-wave based sensor module configured to send and receive an impulse radio wave;
a communicator configured to receive sensed data, through wireless communication, from the sensing device, and transmit, through the wireless communication, a generated control signal to the sensing device for controlling an operation of the sensing device; and
a processor configured to process the sensed data through the wireless communication,
wherein the radio-wave based sensor module senses any one or any combination of any two or more of signals indicative of a breath, a heartbeat, and a motion of a user, a position of obstacle, and a distance from the obstacle,
wherein the radio-wave based sensor module comprises two or more radar sensors forming a sensing area by overlapping sent sensing signals, and
wherein the two or more radar sensors sense objects within the sensing area.

2. The mobile terminal of claim 1, wherein the processor is configured to process the sensed data to estimate at least one of bio-information of a user, position information of the user, and position information of an obstacle.

3. The mobile terminal of claim 2, wherein the processor is configured to generate the control signal to drive a motor controlling a driver included in the sensing device in response to the estimated position information of the user indicating a movement of the user.

4. The mobile terminal of claim 2, further comprising: a display configured to display the estimated at least one information.

5. The mobile terminal of claim 2, wherein the processor is configured to generate emergency medical information based on the bio-information, and the communicator is configured to transmit the emergency medical information to a medical institution server.

6. The mobile terminal of claim 1, wherein the radio-wave based sensor module is an ultra wideband (UWB) radar module.

7. The mobile terminal of claim 2, wherein the communicator is configured to receive, from the sensing device, identification information to identify a target connected to the sensing device, and the processor is configured to process the sensed data based on the identification information.

8. A mobile terminal, comprising:
   an attachment configured to be attached to a sensing device, the sensing device comprising a radio-wave based sensor module configured to send and receive an impulse radio wave;
   a communicator configured to receive sensed data and identification information from the sensing device, the identification information identifying a target connected to the sensing device; and
   a processor configured to process the sensed data based on the identification information,
   wherein the radio-wave based sensor module comprises two or more radar sensors forming a sensing area by overlapping sent sensing signals, and
   wherein the two or more radar sensors sense objects within the sensing area.

9. The mobile terminal of claim 8, wherein the identification information comprises a characteristic code identifying the target to be connected to the sensing device and a control code to control the target.

10. A mobile terminal, comprising:
    a target system;
    a communicator configured to receive sensed data, through wireless communication, from a sensing device, the sensing device comprising a radio-wave based sensor module configured to send and receive an impulse radio wave in a wide frequency band, and transmit, through the wireless communication, a generated control signal to the sensing device; and
    a controller configured to estimate at least one of a gesture and a motion of a user based on the sensed data, and control the target system using the generated control signal, the generated control signal being generated based on at least one of the estimated gesture and the estimated motion,
    wherein the radio-wave based sensor module senses any one or any combination of any two or more of signals indicative of a breath, a heartbeat, and a motion of a user, a position of obstacle, and a distance from the obstacle,
    wherein the radio-wave based sensor module comprises two or more radar sensors forming a sensing area by overlapping sent sensing signals, and
    wherein the two or more radar sensors sense objects within the sensing area.

11. The mobile terminal of claim 10, wherein the controller is configured to control, using the generated control signal, the target system by verifying, based on the sensed data, whether the gesture or the motion of the user is moving away from or close to the sensing device or whether the gesture or the motion of the user moves laterally with respect to the sensing device.

12. The mobile terminal of claim 10, wherein the target system comprises an audio system comprising a speaker.

13. The mobile terminal of claim 12, wherein the controller is configured to control, using the generated control signal, the audio system to play or pause music by verifying, based on the sensed data, whether the gesture or the motion of the user is moving away from or close to the sensing device.

14. The mobile terminal of claim 12, wherein the controller is configured to control, using the generated control signal, a volume of the speaker by verifying, based on the sensed data, whether the gesture or the motion of the user is moving away from or close to the sensing device.

15. The mobile terminal of claim 12, wherein the controller is configured to control, using the generated control signal, at least one of playing music on the audio system, stopping or pausing playback of music, controlling a volume of the speaker, playing back a previous or subsequent song, and playing a melody based on at least one of the gesture and the motion of the user.

16. The mobile terminal of claim 10, wherein the communicator is configured to receive, from the sensing device, identification information to be used to identify the sensing device, and the controller is configured to process the sensed data based on the identification information.

17. The mobile terminal of claim 10, wherein the radio-wave based sensor module is an ultra wideband (UWB) radar module.

* * * * *